(Model.)

J. R. GILBERT.
COMBINED GARDEN HOE AND SEED PLANTER.

No. 261,147. Patented July 18, 1882.

UNITED STATES PATENT OFFICE.

JAMES R. GILBERT, OF LEESBURG, GEORGIA.

COMBINED GARDEN-HOE AND SEED-PLANTER.

SPECIFICATION forming part of Letters Patent No. 261,147, dated July 18, 1882.

Application filed December 31, 1881. (Model.)

*To all whom it may concern:*

Be it known that I, JAMES R. GILBERT, of Leesburg, in the county of Lee and State of Georgia, have invented certain new and useful Improvements in Combined Garden-Hoe and Seed-Planter; and I do hereby declare that the following is a full, clear, and exact description of the invention, which will enable others skilled in the art to which it appertains to make and use the same, reference being had to the accompanying drawings, which form a part of this specification.

Figure 1:
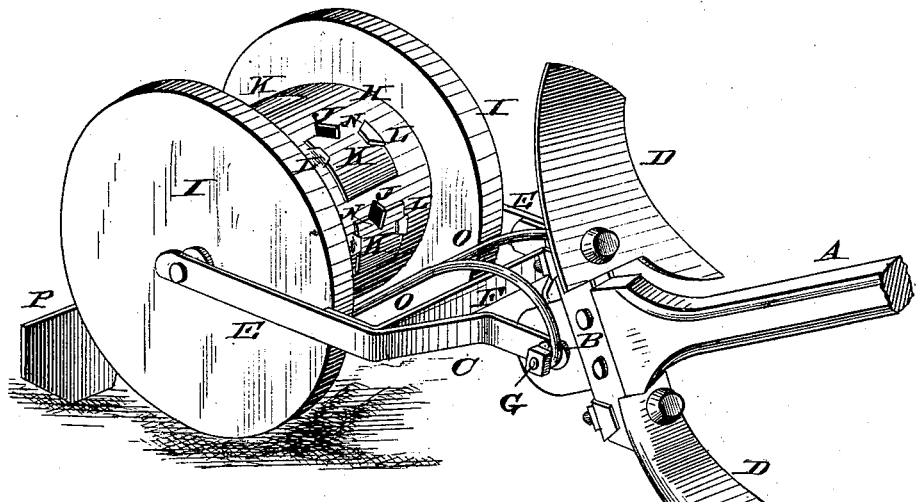
Figure 2:
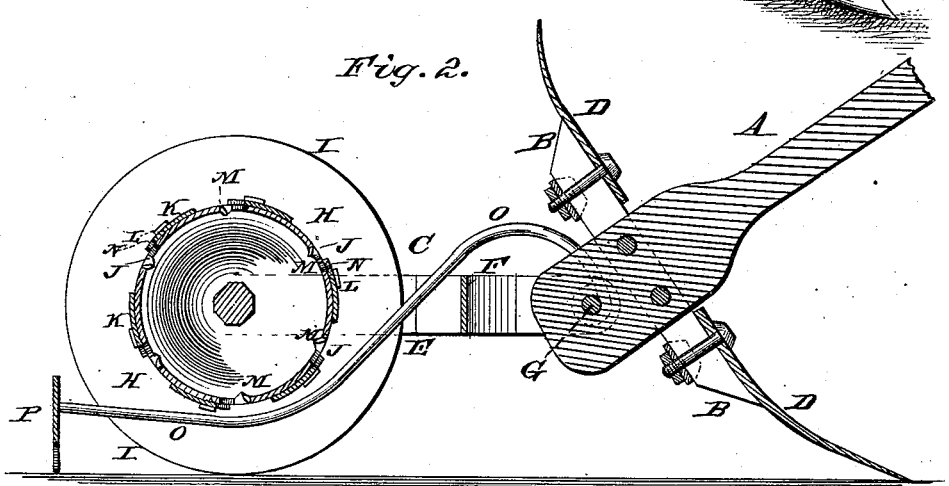
Figure 3:
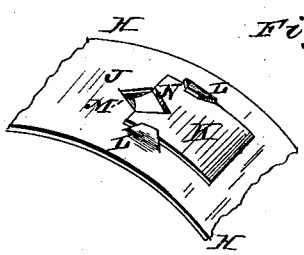

Figure 1 is a perspective view. Fig. 2 is a longitudinal vertical sectional view. Fig. 3 is a detail view, showing the construction of the openings in the seed-cylinder.

Corresponding parts in the several figures are denoted by like letters of reference.

This invention relates to an improved combined garden-hoe and seed-planter, the construction and operation of which will be hereinafter fully described, and particularly pointed out in the claim.

In the drawings hereto annexed, A represents the beam, and B the standard, which consists of two braces secured vertically in recesses in the sides of the beam, and projecting upward and downward from the latter, as shown. The upper and lower ends of the standard carry blades D of different shape and dimensions, either of which may be placed in position for operation by reversing the beam.

C is a frame consisting of side pieces, E E, connected by a brace, F, in front of which the beam A is pivoted upon a bolt, G, connecting the said side pieces. By temporarily removing the pivot-bolt the beam may be reversed, as above mentioned. Upon a suitable axle or spindles at the rear end of the frame is mounted the seeding-cylinder H, the ends of which are provided with flanges I, forming wheels upon which the said cylinder is supported. The latter is preferably constructed of sheet metal suitably secured to the flanges or disks I, and having a circumferential series of diamond-shaped openings, J, of sufficient size to admit the largest seeds which it may be desired to plant, and one or all of which should be large enough to enable the cylinder to be conveniently filled with seed by the use of a suitable funnel. The openings J are covered by slides K, sliding in bearings formed by lips L, struck up from the sheet-metal casing or cylinder. Slides K are provided at one of their ends with triangular or V-shaped notches N, which may be so adjusted in relation to the seed-openings as to regulate the size of the latter with reference to the kind and quantity of seed which it may be desired to plant. When it is desired to drop seed only at considerable intervals one or more of the seed-openings may be entirely closed by the slides K. The front ends of the diamond-shaped openings J are provided with downturned flanges M, which serve to guide the seed contained in the cylinder toward the next opening, thus causing the dropping or planting of seed to be certain and regular. The construction of said flanges is clearly shown in Fig. 3 of the drawings.

O O are rods or brackets, pivoted upon the bolt G, extending rearward under the seeding-cylinder and carrying the scraper or covering blade P, by which the soil is thrown lightly over the seeds just deposited in the furrow made by either of the blades D carried by the beam.

From the foregoing description, taken in connection with the drawings hereto annexed, the operation of my invention will be readily understood. It may be easily managed by a boy, is convenient and useful for planting all kinds of seeds, and it is simple, durable, and inexpensive.

Having thus described my invention, I claim and desire to secure by Letters Patent of the United States—

The combination, with the frame C, having flanged rotary hopper or seeding-cylinder H and pivoted beam A, of the rods or brackets O, pivoted upon the same bolt as beam A, extending rearward under the hopper, and carrying the covering-blade P, substantially as set forth.

In testimony that I claim the foregoing as my own I have hereto affixed my signature in presence of two witnesses.

JAMES ROSS GILBERT.

Witnesses:
COLIN MURCHSON McDONALD,
NATHANIEL HARRIS WARE.